US008619056B2

(12) United States Patent
Lin et al.

(10) Patent No.: US 8,619,056 B2
(45) Date of Patent: Dec. 31, 2013

(54) GHOST RESOLUTION FOR A CAPACITIVE TOUCH PANEL

(75) Inventors: Chia-Hsing Lin, Hsinchu (TW); Yi-Hsin Tao, Hsinchu (TW); Po-Hao Kuo, Taipei (TW); Hsin-Shieh Tsai, Yuanlin Town, Changhua County (TW); Min-Jhih Lin, Kaohsiung (TW)

(73) Assignee: Elan Microelectronics Corp., Hsinchu (TW)

( * ) Notice: Subject to any disclaimer, the term of this patent is extended or adjusted under 35 U.S.C. 154(b) by 728 days.

(21) Appl. No.: 12/649,779

(22) Filed: Dec. 30, 2009

(65) Prior Publication Data

US 2010/0188364 A1 Jul. 29, 2010

(30) Foreign Application Priority Data

Jan. 7, 2009 (TW) ................................ 98100351 A
Feb. 19, 2009 (TW) ................................ 98105214 A

(51) Int. Cl.
*G06F 3/045* (2006.01)

(52) U.S. Cl.
USPC .......................................................... 345/174

(58) Field of Classification Search
USPC .............. 345/73, 156–184; 178/18.01–19.07; 324/658–662, 687, 688; 341/20, 26, 33
See application file for complete search history.

(56) References Cited

U.S. PATENT DOCUMENTS

| | | | | |
|---|---|---|---|---|
| 5,856,822 A * | 1/1999 | Du et al. | ........................ | 345/73 |
| 7,158,056 B2 * | 1/2007 | Wright et al. | .................... | 341/26 |
| 7,969,331 B2 * | 6/2011 | Williams et al. | ................ | 341/33 |
| 7,982,723 B2 * | 7/2011 | Ningrat | ........................... | 345/174 |
| 8,072,429 B2 * | 12/2011 | Grivna | ............................ | 345/173 |
| 8,086,417 B2 * | 12/2011 | Seguine | ........................ | 702/105 |
| 8,179,408 B2 * | 5/2012 | Chen et al. | ....................... | 347/174 |
| 8,237,667 B2 * | 8/2012 | Krah | .............................. | 345/173 |
| 8,319,737 B2 * | 11/2012 | Noguchi et al. | ............... | 345/173 |
| 8,466,886 B2 * | 6/2013 | Mizuhashi et al. | ........... | 345/173 |
| 8,482,547 B2 * | 7/2013 | Christiansson et al. | ....... | 345/175 |
| 2007/0188180 A1 * | 8/2007 | Deangelis et al. | ............. | 324/661 |
| 2008/0150906 A1 * | 6/2008 | Grivna | ........................... | 345/173 |
| 2008/0309625 A1 * | 12/2008 | Krah et al. | ..................... | 345/173 |
| 2008/0309626 A1 * | 12/2008 | Westerman et al. | ........... | 345/173 |
| 2009/0009194 A1 * | 1/2009 | Seguine | ......................... | 324/684 |
| 2009/0021401 A1 * | 1/2009 | Williams et al. | ................. | 341/24 |
| 2009/0174675 A1 * | 7/2009 | Gillespie et al. | ............... | 345/173 |
| 2010/0007629 A1 * | 1/2010 | Chang | ............................ | 345/174 |
| 2010/0007630 A1 * | 1/2010 | Chang | ............................ | 345/174 |
| 2010/0007631 A1 * | 1/2010 | Chang | ............................ | 345/174 |
| 2010/0039405 A1 * | 2/2010 | Chen et al. | ...................... | 345/174 |
| 2010/0059295 A1 * | 3/2010 | Hotelling et al. | ........... | 178/18.06 |
| 2010/0066701 A1 * | 3/2010 | Ningrat | ........................ | 345/174 |
| 2011/0074735 A1 * | 3/2011 | Wassvik et al. | ................ | 345/174 |
| 2011/0090176 A1 * | 4/2011 | Christiansson et al. | ....... | 345/175 |
| 2011/0163996 A1 * | 7/2011 | Wassvik et al. | ................ | 345/175 |
| 2011/0242052 A1 * | 10/2011 | Ningrat | ........................ | 345/174 |
| 2012/0044150 A1 * | 2/2012 | Karpin et al. | .................. | 345/173 |

* cited by examiner

*Primary Examiner* — Prabodh M Dharia
(74) *Attorney, Agent, or Firm* — Muncy, Geissler, Olds & Lowe, PLLC

(57) ABSTRACT

Ghost resolution sensing methods are provided for capacitive touch panels. When ghost is detected involving two points on a capacitive touch panel, for each of the two points, the intersected traces at that one are concurrently charged to sense the capacitance value from either one of the intersected traces, and according thereto, a real point and a ghost point can be distinguished from each other. Alternatively, the intersected traces are crisscross driven by two synchronous and in phase signals or synchronous but out of phase signals, to sense the capacitance values at the two points. Preferably, intersectional calibration is performed in conjunction therewith, to recognize the real points.

15 Claims, 15 Drawing Sheets

GHOST RESOLUTION FOR A CAPACITIVE TOUCH PANEL

FIELD OF THE INVENTION

The present invention is related generally to touch screens and, more particularly, to ghost resolution for capacitive touch panels.

BACKGROUND OF THE INVENTION

For touch screen applications, axis-intersect (AI) array projected capacitance sensing is the most popular touch sensing method due to its high optical clarity, durability and low cost. However, in detection of multi-touch, this art will result in ghost points and thereby cannot recognize the real points of the fingers touching on a capacitive touch panel.

FIG. 1 is a diagram showing a 2×2 ghost phenomenon of an XY-projected touch panel. When two fingers touches on the capacitive touch panel at an upper left point A and a lower right point D respectively, as shown in the right-side figure, or at an upper right point B and a lower left point C respectively, as shown in the left-side figure, a same capacitance variation scheme is induced, and there is no way to make difference for these two cases. Therefore, the control circuit of the touch panel cannot recognize the real points from the four points A, B, C and D.

In further detail, as shown in FIG. 2, ghost induced by a two-finger application involves two sets of coordinates. The capacitance variation in X-direction has two peaks at traces $x_1$ and $x_2$, and the capacitance variation in Y-direction has two peaks at traces $y_1$ and $y_2$. After excluding the combinations of coordinates with the same X-coordinate or Y-coordinate, two sets of coordinates remain as possible locations of the fingers, namely $(x_1y_1, x_2y_2)$ and $(x_1y_2, x_2y_1)$, of which one corresponds to the real points, and the other to ghost points. For multi-touch of three or more fingers, the number of ghost candidates will drastically increase. For example, as shown in FIG. 3, in the event of a three-finger application, there will be six sets of coordinates corresponding to possible real points, i.e., $(x_1y_1, x_2y_2, x_3y_3)$, $(x_1y_1, x_2y_3, x_3y_2)$, $(x_1y_2, x_2y_1, x_3y_3)$, $(x_1y_2, x_2y_3, x_3y_1)$, $(x_1y_3, x_2y_2, x_3y_1)$, and $(x_1y_3, x_2y_1, x_3y_2)$, of which five sets are ghost points.

Multi-touch is undoubtedly an important trend for the development of touch screens in future, and therefore it is desired a ghost resolution sensing method for improvement of the conventional AI array projected capacitance sensing.

SUMMARY OF THE INVENTION

An object of the present is to provide a ghost resolution sensing method for a capacitive touch panel.

According to the present invention, a ghost resolution sensing method for a capacitive touch panel suffering a ghost phenomenon involving two points on the capacitive touch panel corresponding to a same coordinate in a first direction, comprises concurrently charging a trace in the first direction and a trace in a second direction at the first point, sensing a first capacitance value from the charged trace in the first direction or the charged trace in the second direction at the first point, concurrently charging a trace in the first direction and a trace in the second direction at the second point, sensing a second capacitance value from the charged trace in the first direction or the charged trace in the second direction at the second point, and recognizing a real point from the two points according to the first and second capacitance values.

According to the present invention, a ghost resolution sensing method for a capacitive touch panel suffering a ghost phenomenon involving two points on the capacitive touch panel corresponding to a same coordinate in a first direction, comprises concurrently charging a trace in the first direction and a trace in a second direction at the first point, sensing a first capacitance value from the charged trace in the first direction and a second capacitance value from the charged trace in the second direction at the first point, summing up the first and second capacitance values to obtain a first summed-up capacitance value, concurrently charging a trace in the first direction and a trace in the second direction at the second point, sensing a third capacitance value from the charged trace in the first direction and a fourth capacitance value from the charged trace in the second direction at the second point, summing up the third and fourth capacitance values to obtain a second summed-up capacitance value, and recognizing a real point from the two points according to the first and second summed-up capacitance values.

According to the present invention, a ghost resolution sensing method for a capacitive touch panel suffering a ghost phenomenon involving two points on the capacitive touch panel corresponding to a same coordinate in a first direction, comprises concurrently charging a trace in the first direction and a trace in a second direction at the first point for the trace in the first direction at the first point to be sensed a first capacitance value therefrom, charging the trace in the first direction at the first point while grounding the trace in the second direction at the first point for the trace in the first direction at the first point to be sensed a second capacitance value therefrom, extracting a first differential capacitance value between the first and second capacitance values, concurrently charging a trace in the first direction and a trace in a second direction at the second point for the trace in the first direction at the second point to be sensed a third capacitance value therefrom, charging the trace in the first direction at the second point while grounding the trace in the second direction at the second point for the trace in the first direction at the second point to be sensed a fourth capacitance value therefrom, extracting a second differential capacitance value between the third and fourth capacitance values, and recognizing a real point from the two points according to the first and second differential capacitance values.

By comparing the detected capacitance values, the ghost resolution sensing methods according to the present invention not only recognize real points rapidly and precisely but also provide the coordinates necessary for the precise positioning of the real points.

According to the present invention, a ghost resolution sensing method for a capacitive touch panel suffering a ghost phenomenon involving two points on the capacitive touch panel corresponding to a same coordinate in a first direction, comprises concurrently driving a trace in the first direction at the first point with a first signal and a trace in a second direction at the first point with a second signal synchronous to the first signal, sensing a first capacitance value from the driven trace in the first direction or the driven trace in the second direction at the first point, concurrently driving a trace in the first direction at the second point with the first signal, and a trace in the second direction at the second point with the second signal, sensing a second capacitance value from the driven trace in the first direction or the driven trace in the second direction at the second point, and recognizing a real point from the two points according to the first and second capacitance values.

The first signal and the second signal are synchronous and in phase with each other, or synchronous but out of phase with each other.

Preferably, intersectional calibration is performed on the traces of the capacitive touch panel so that each of the traces will have a same base capacitance value.

BRIEF DESCRIPTION OF THE DRAWINGS

These and other objects, features and advantages of the present invention will become apparent to those skilled in the art upon consideration of the following description of the preferred embodiments according to the present invention taken in conjunction with the accompanying drawings, in which.

DETAILED DESCRIPTION OF THE INVENTION

Figure 4:
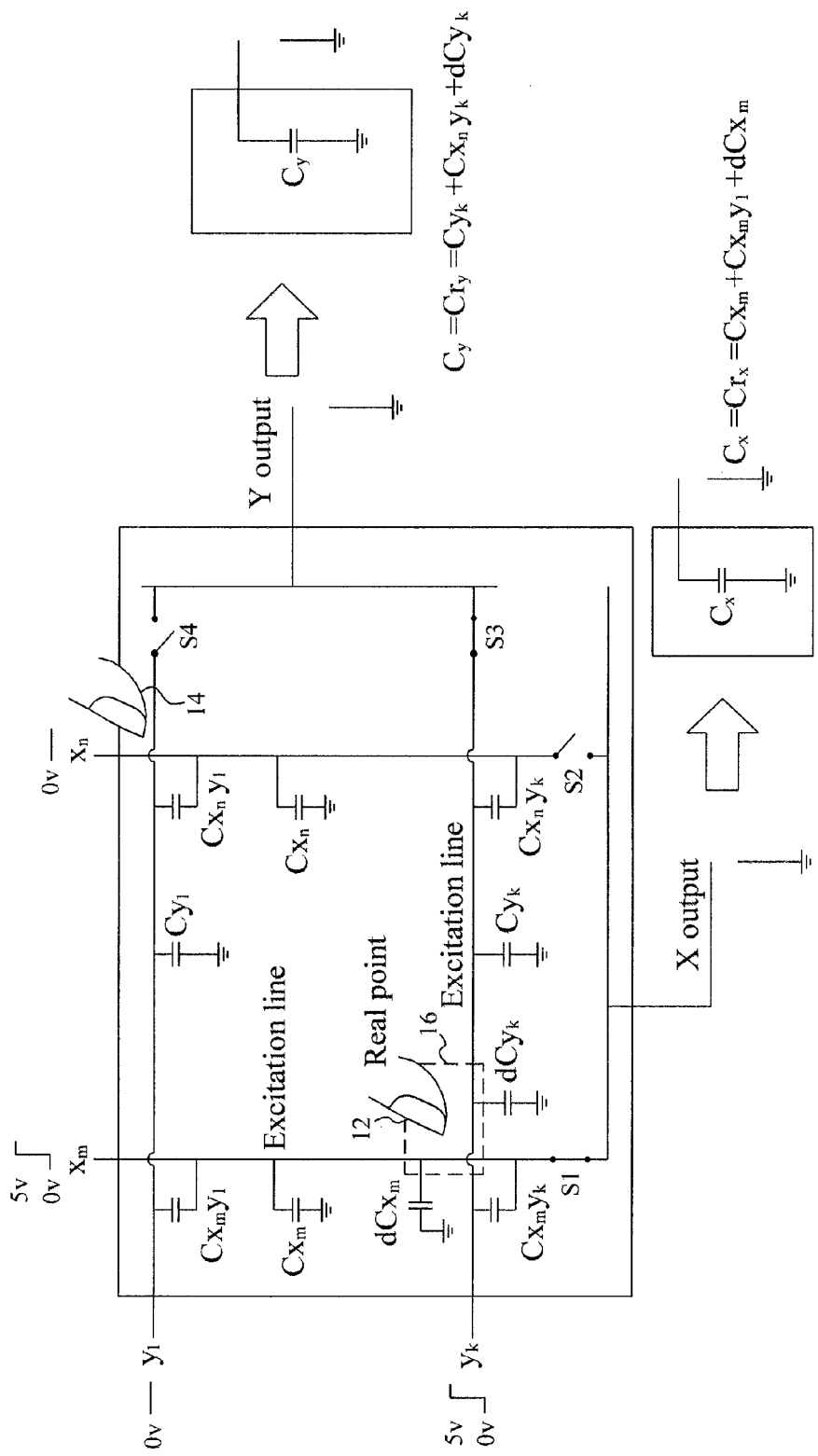
FIGS. 4 and 5 are diagrams showing a first embodiment according to the present invention.

FIG. 4 is a diagram showing a first embodiment according to the present invention, in which the touch point 16 of a finger 12 has the coordinates $x_m y_k$ and the touch point of a finger 14 has the coordinates $x_n y_1$. The fingers 12 and 14 will cause a capacitance variation of the capacitive touch panel, which has peaks at points $x_m y_1$, $x_m y_k$, $x_n y_1$, and $x_n y_k$ including ghost points thereof, and in consequence the control circuit of the capacitive touch panel cannot determine whether the finger 12 is at $x_m y_1$ or $x_m y_k$, nor whether the finger 14 is at $x_n y_1$ or $x_n y_k$. As a result, there are two sets of possible ghost coordinates, namely $(x_m y_1, x_n y_k)$ and $(x_m y_k, x_n y_1)$, and the points $x_m y_1$, $x_m y_k$, $x_n y_1$, and $x_n y_k$ are referred as candidate ghost points. A ghost resolution sensing method is thus proposed to recognize the real points from the candidate ghost points, by which each of the points showing a peak in the capacitance variation, i.e. the candidate ghost points, is detected for its capacitance values under its traces in X-direction and in Y-direction being charged concurrently. For example, to detect the point 16 $(x_m y_k)$, switches S1 and S3 are closed so that the controller (not shown in the figure) could concurrently charge traces $x_m$ and $y_k$ by a same signal and sense the capacitance values of the traces $x_m$ and $y_k$. The trace $x_m$ has a capacitance value Cx equal to $Cx_m + Cx_m y_1 + dCx_m + Cx_m y_k$, where $dCx_m$ is the capacitance variation of the trace $x_m$ due to proximity of the finger 12, $Cx_m$ is the sum of the capacitance values between the trace $x_m$ and other grounded traces and between the trace $x_m$ and the ground plane, $Cx_m y_1$ is the capacitance value between the traces $x_m$ and $y_1$, and $Cx_m y_1$ is the capacitance value between the traces $x_m$ and $y_k$. Since the traces $x_m$ and $y_k$ under charged by a same signal are equipotential, $Cx_m y_k$ is measured as zero. The detected point 16 is the real point of the finger 12, so that the total capacitance value Cx detected from the trace $x_m$ is $Crx = Cx_m + Cx_m y_1 + dCx_m$. Similarly, as the real point of the finger 12 is at $x_m y_k$, the capacitance value Cy detected from the trace $y_k$ in Y-direction will be $Cry = Cy_k + Cx_n y_k + dCy_k$.

Figure 5:
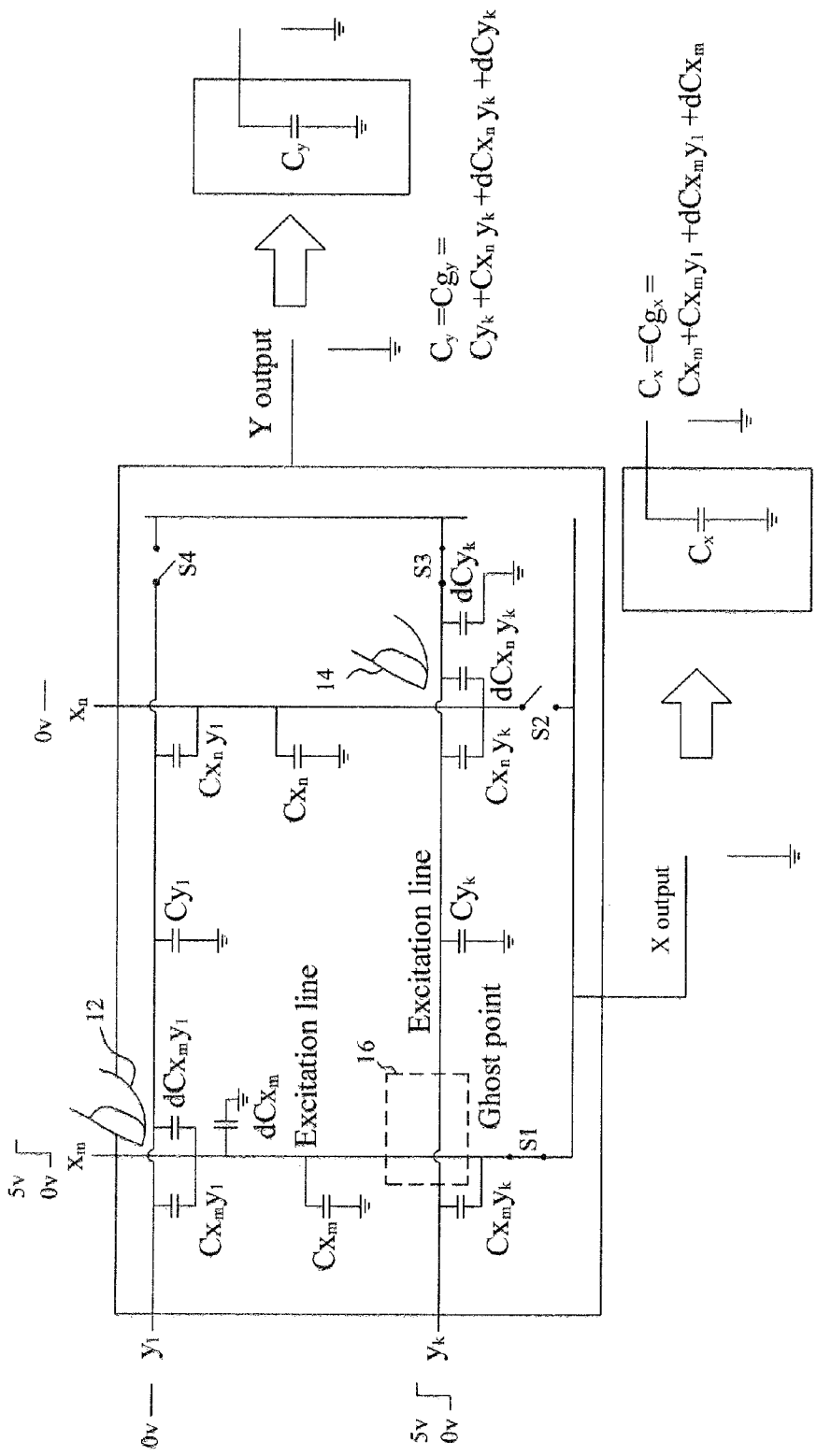

FIG. 5 is a diagram showing another case that the fingers 12 and 14 are at the points $x_m y_1$ and $x_n y_k$ respectively, and the point 16 is detected. In this case, when the controller concurrently charges the traces $x_m$ and $y_k$ by a same signal, the traces $x_m$ and $y_k$ are equipotential and in consequence the capacitance value $Cx_m y_k$ is measured as zero. However, the finger 12 at the point $x_m y_1$ will induce a capacitance variation $dCx_m y_1$ between the traces $y_1$ and $x_m$, where $dCx_m y_1$ has a negative value, and hence the total capacitance value Cx detected from the trace $x_m$ will be $Cgx = Cx_m + Cx_m y_1 + dCx_m y_1 + dCx_m$. Similarly, as the finger 14 is at the point $x_n y_k$, a negative capacitance variation $dCx_n y_k$ between the traces $x_n$ and $y_k$ is induced, and the capacitance value Cy detected from the trace $y_k$ will be $Cgy = Cy_k + Cx_n y_1 + dCx_n y_k + dCy_k$.

The capacitance values Crx and Cgx in X-direction extracted as described in FIGS. 4 and 5 are compared to each other, and so are the capacitance values Cry and Cgy in Y-direction. Since $dCx_m y_1$ is negative, the detected capacitance value Crx ($= Cx_m + Cx_m y_1 + dCx_m$) of the real point will be greater than the detected capacitance value Cgx ($= Cx_m + Cx_n y_1 + dCx_m y_1 + dCy_m$) of the ghost point. Similarly, as $dCx_n y_k$ is negative, the detected capacitance value Cry ($= Cy_k + Cx_n y_k + dCy_k$) of the real point will be greater than the capacitance value Cgy ($= Cy_k + Cx_n y_k + dCx_n y_k + dCy_k$) of the ghost point. In short, after sensing the capacitance values of the traces in X-direction and in Y-direction at two candidate ghost points under charged by a same signal, and comparing the two detected capacitance values to each other, the real point can be identified from the two candidate ghost points.

Figure 6:
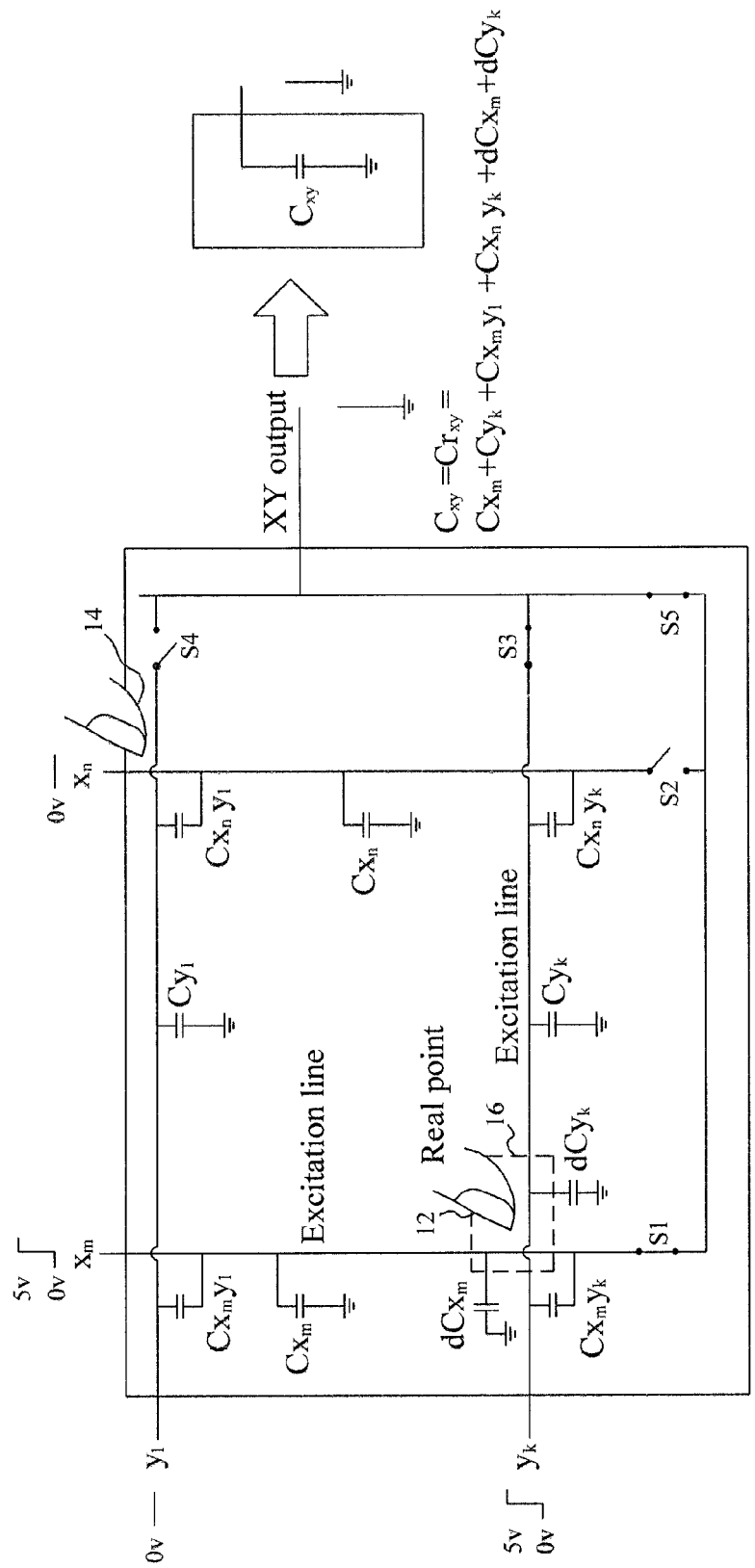
FIGS. 6 and 7 are diagrams showing a second embodiment according to the present invention.
Figure 7:
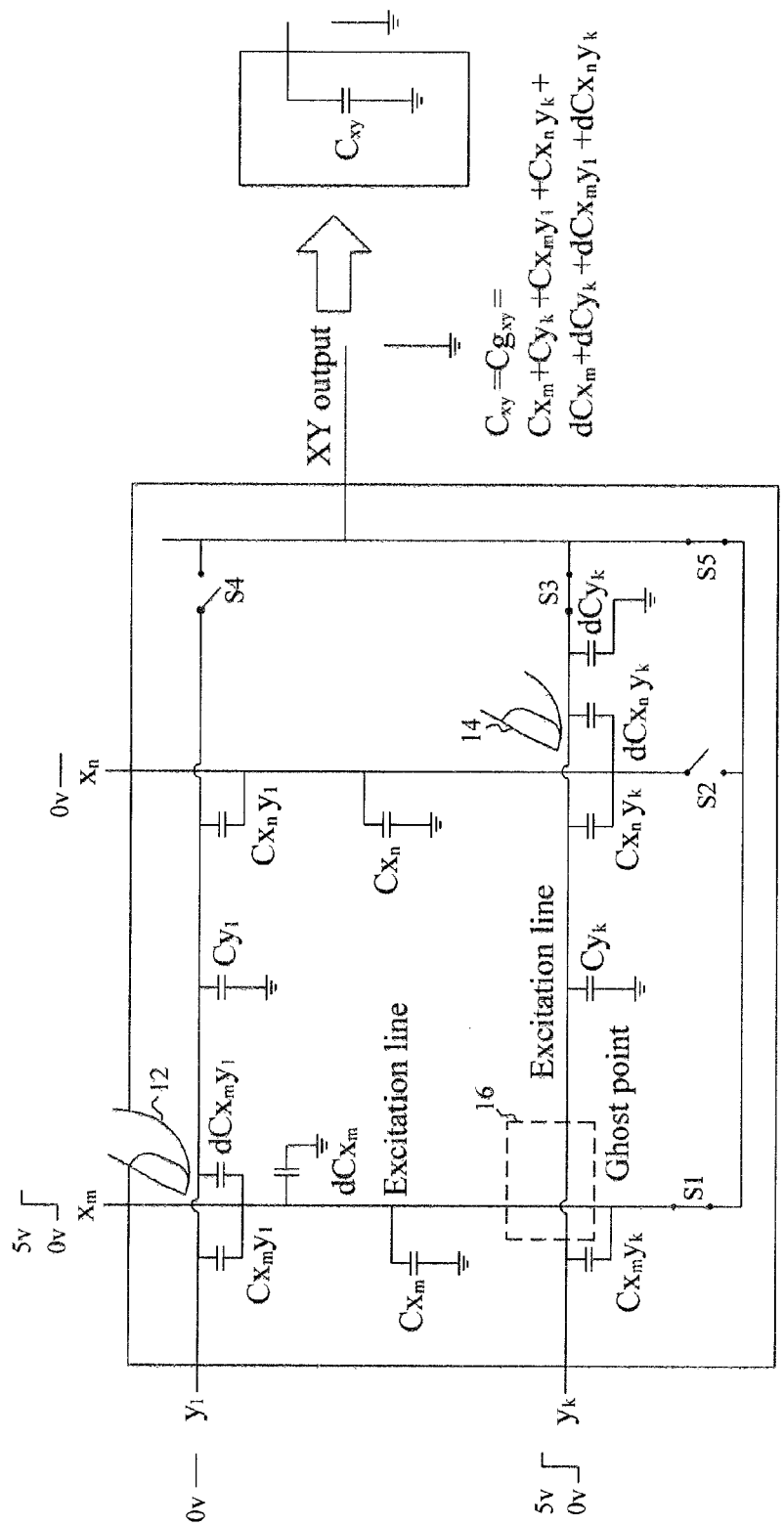

FIGS. 6 and 7 are diagrams showing another embodiment according to the present invention, by which a trace in X-direction and a trace in Y-direction at a detected point are connected together to directly extract the sum of the capacitance values thereof. As shown in FIG. 6, if the detected point 16 is the real point of a finger 12, the detected capacitance value Cxy is $Crxy = Cx_m + Cy_k + Cx_m y_1 + Cx_n y_k + dCx_m + dCy_k$. As shown in FIG. 7, if the detected point 16 is not the real point of the finger 12, the detected capacitance value Cxy is $Cgxy = Cx_m + Cy_k + Cx_m y_1 + Cx_n y_k + dCx_m + dCy_k + dCx_m y_1 + dCx_n y_k$. The varying capacitances $dCx_m y_1$ and $dCx_n y_k$ both have negative values. For a tow-finger application, although there are four candidate ghost points, once a real point is identified, the candidate ghost points having the same coordinate in X-direction or in Y-direction as the real point cannot be the other real point. Therefore, to recognize real points for a two-finger application, it needs only one comparison of two candidate ghost points having a same coordinate in X-direction or in Y-direction.

Figure 1:
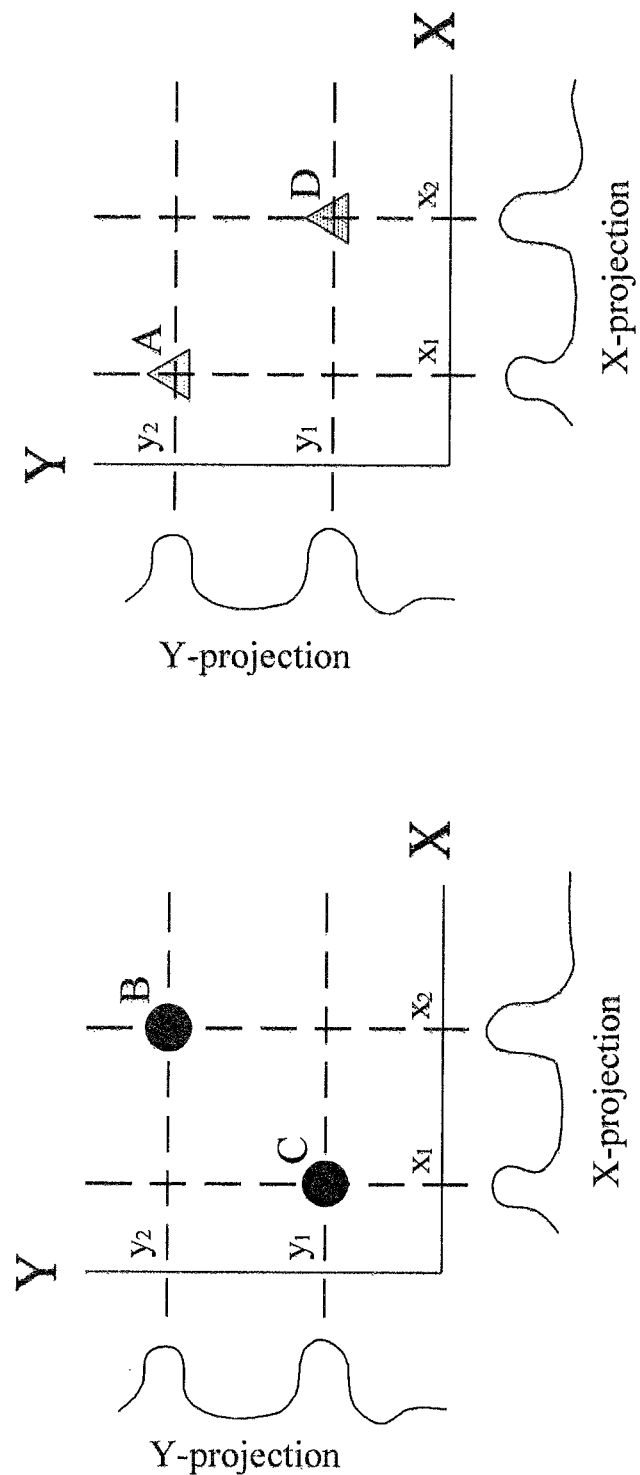
FIG. 1 is a diagram showing a 2×2 ghost phenomenon of an XY-projected touch panel.
Figure 2:
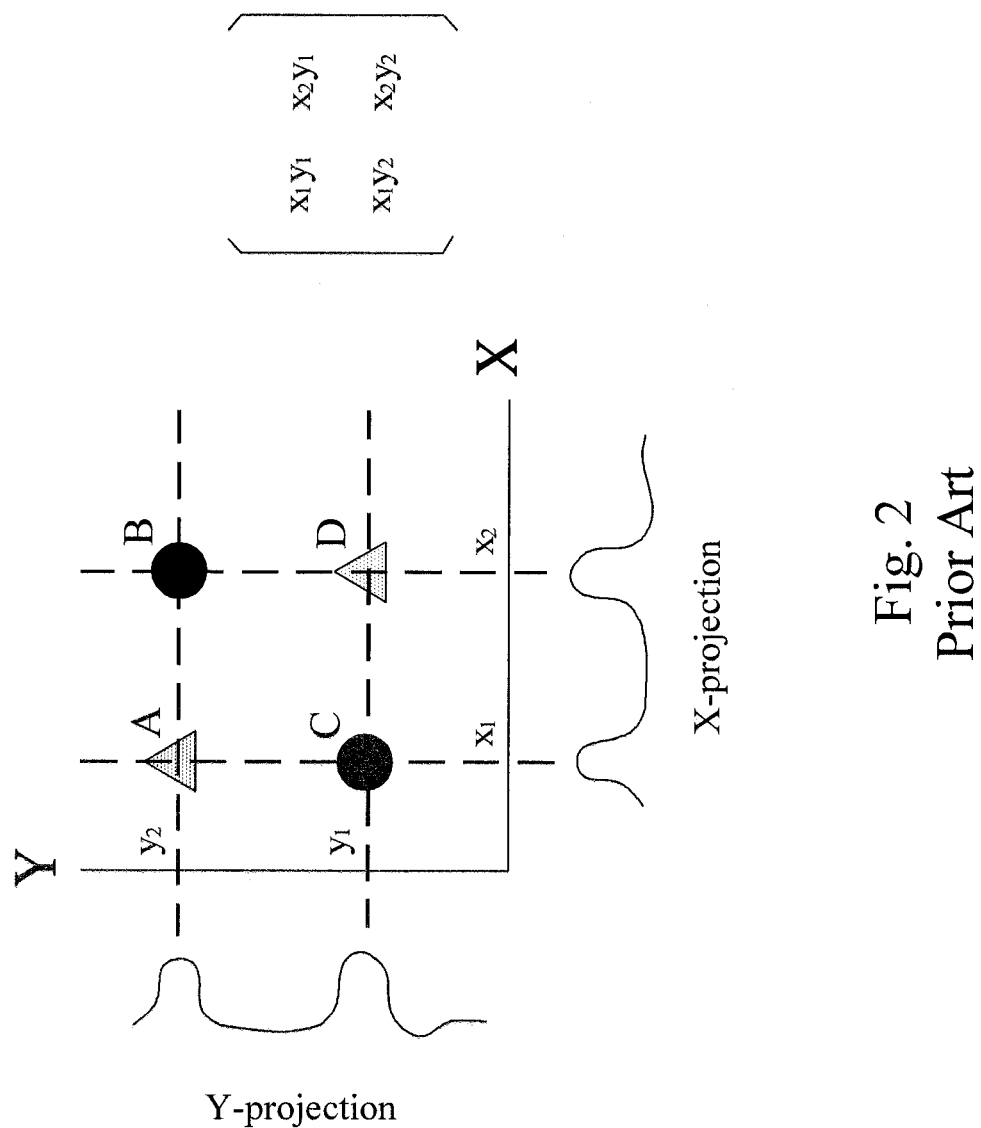
FIG. 2 is a diagram showing the coordinates of candidate ghost points induced by a two-finger application.
Figure 3:
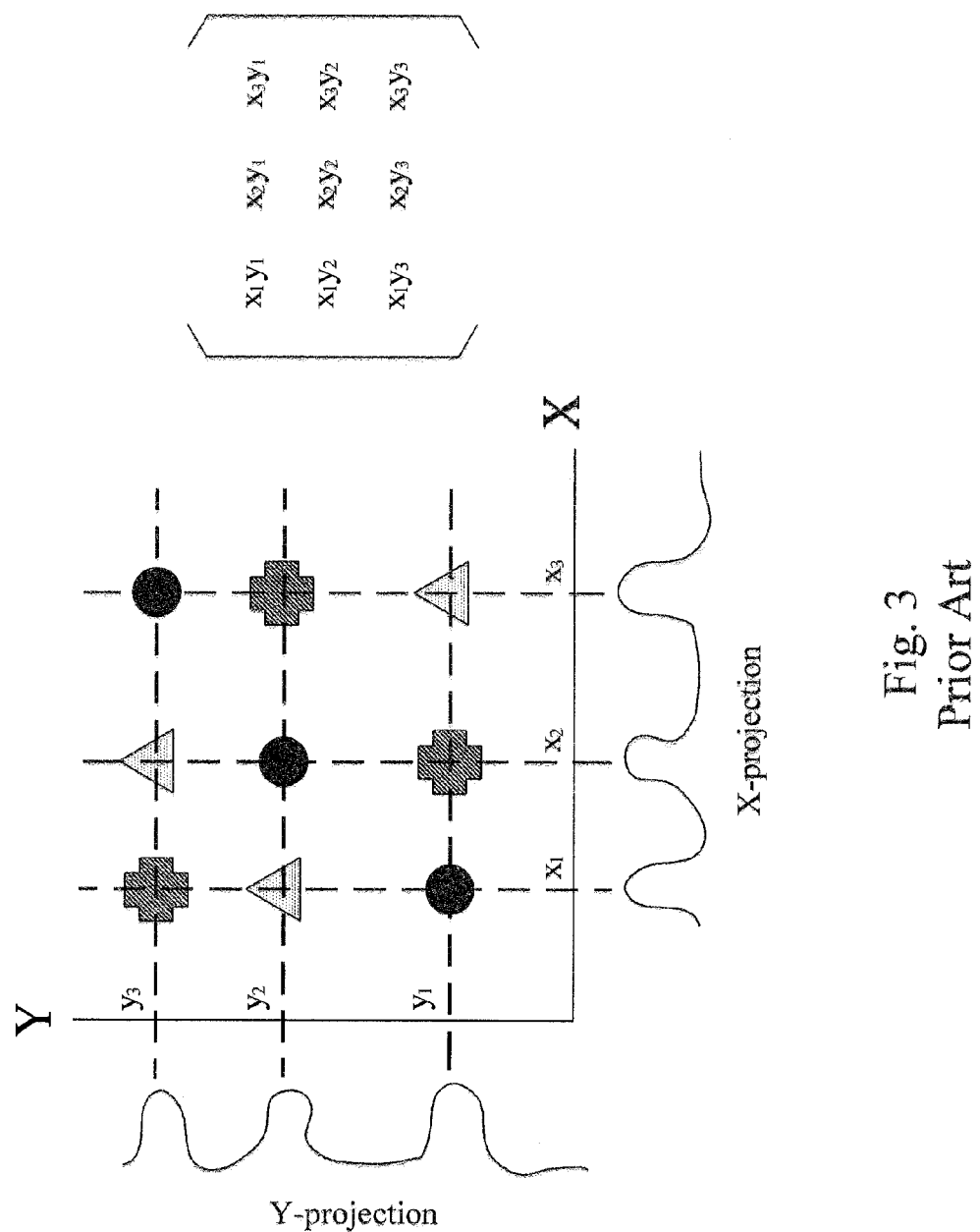
FIG. 3 is a diagram showing the coordinates of candidate ghost points induced by a three-finger application.

When the aforesaid ghost resolution sensing method is applied for a three-finger application which induces up to nine candidate ghost points as shown in FIG. 3 and three of them have a same coordinate in X-direction, to begin with, detection is performed, for example, to two points $(x_1, y_1)$ and $(x_1, y_2)$ having a same coordinate $x_1$, and if the detected capacitance values are equal, the two points $(x_1, y_1)$ and $(x_1, y_2)$ are both ghost points, and consequently the remaining candidate ghost point $(x_1, y_3)$ that has the same coordinate $x_1$ as the aforesaid two points is a real point. On the contrary, if the detected capacitance values are not equal, the one having the greater capacitance value is a real point. Therefore, a first real point can be identified by detecting only once. After a first real point is determined, as the point $(x_1, y_3)$ for example, it can be known that those candidate ghost points $(x_1, y_1)$, $(x_1, y_2)$, $(x_2, y_3)$, and $(x_3, y_3)$ having the same coordinate $x_1$ in X-direction or $y_3$ in Y-direction as the point $(x_1, y_3)$ must be ghost points and are therefore excluded from further detection. Next, the candidate ghost points $(x_2, y_2)$ and $(x_2, y_1)$ are detected to recognize the second real point. The last real point is identified by ruling out the remaining candidate ghost points that have the same coordinate in X-direction or in Y-direction as the second real point. In other words, even for a three-finger application, the ghost resolution sensing method according to the present invention can determine the coordinates of the real points by only making two comparisons. In other embodiments, the candidate ghost points are detected one after another to sense the capacitance values of traces at each candidate ghost point, and then a firmware is used for making judgment according to the detected capacitance values of the traces, thereby increasing reliability.

Figure 8:
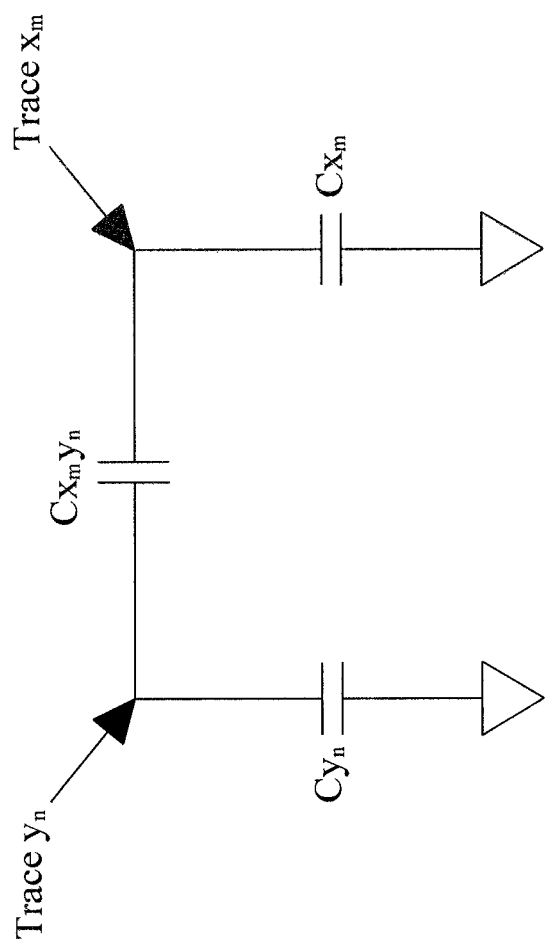
FIG. 8 is a diagram showing the capacitances of two intersected traces.

FIG. 8 is a diagram showing the capacitances of two intersected traces, in which $Cx_m$ is the capacitance of a trace $x_m$ relative to the ground plane, $Cy_n$ is the capacitance of a trace $y_n$ relative to the ground plane, and $Cx_m y_n$ is the coupling capacitance between the traces $x_m$ and $y_n$. When a finger touches at an intersection of the traces $x_m$ and $y_n$, the capacitance value $Cx_m y_n$ will decrease, and according thereto, a ghost resolution sensing method is proposed to directly sense the capacitance value $Cx_m y_n$ between the traces $x_m$ and $y_n$ to distinguish a real point from a ghost point. To begin with, the traces $x_m$ and $y_n$ are charged by a same signal concurrently, and a capacitance value is detected from the trace $x_m$. As the traces $x_m$ and $y_n$ are now equipotential, $Cx_m y_n$ is measured as zero, and in consequence the detected capacitance value is the capacitance value $Cx_m$ of the trace $x_m$ relative to the ground plane. Next, the trace $x_m$ is charged while the trace $y_n$ is grounded. At this time, the traces $x_m$ and $y_n$ are not equipotential so that the capacitance value detected from the trace $x_m$ is $Cx_m + Cx_m y_n$. By subtracting the first detected capacitance value $Cx_m$ from the second detected capacitance value $Cx_m + Cx_m y_n$, the coupling capacitance value $Cx_m y_n$ between the traces $x_m$ and $y_n$ is extracted.

Figure 9:
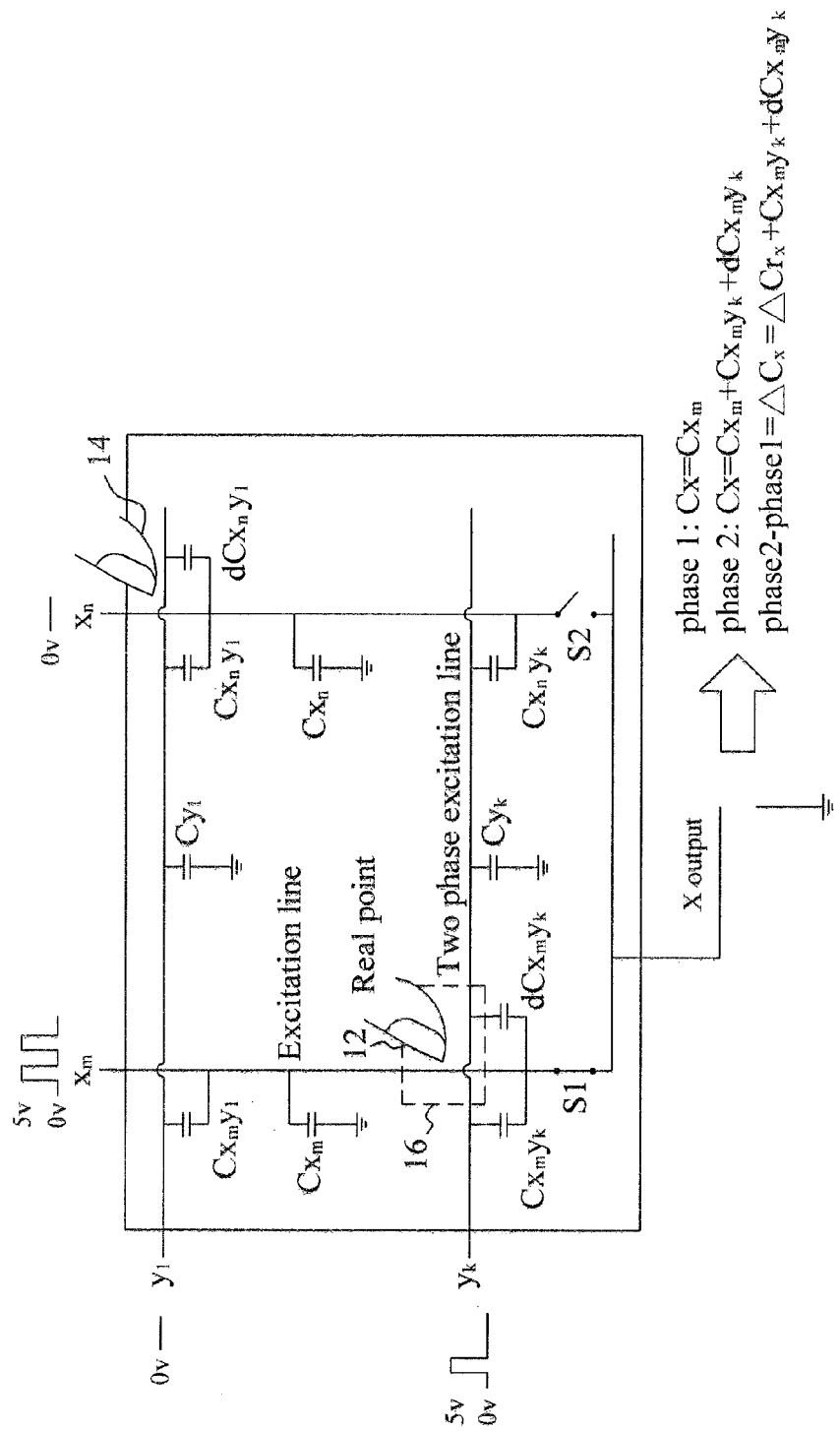
FIGS. 9 and 10 are diagrams showing an embodiment for sensing the capacitance value between two traces according to the present invention.
Figure 10:
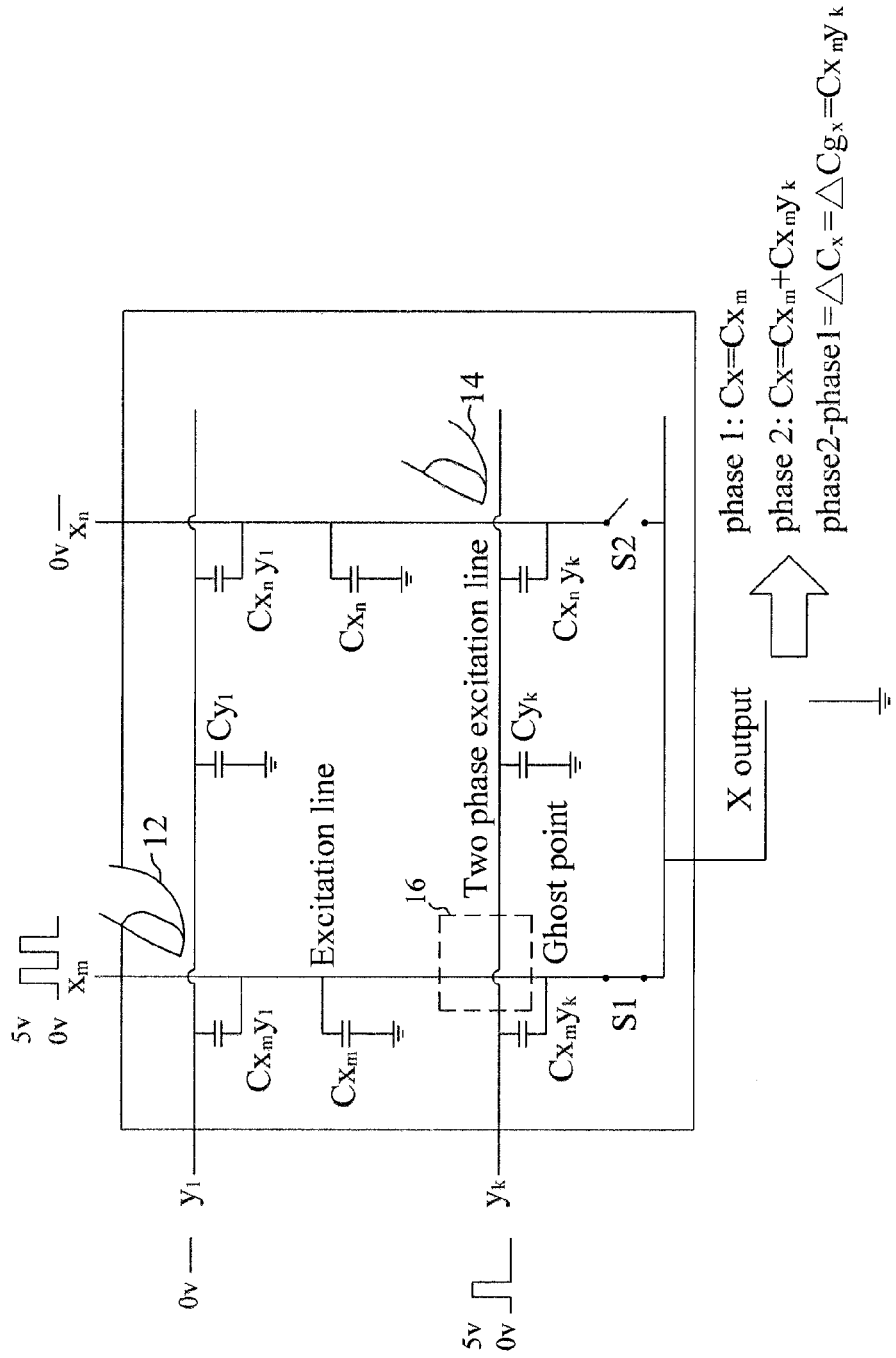

FIGS. 9 and 10 are diagrams showing an embodiment for sensing the capacitance value between two traces according to the present invention. In FIG. 9, the detected point 16 is the real point of a finger 12, and in FIG. 10, the detected point 16 is a ghost point. As shown in FIG. 9, the traces $x_m$ and $y_k$ are concurrently charged in phase 1 during which the trace $x_m$ is detected and a capacitance value $Cx=Cx_m$ is detected; then, in phase 2, the trace $x_m$ is charged while the trace $y_k$ is grounded, and the capacitance value detected from the trace $x_m$ is $Cx=Cx_m+Cx_m y_k+dCx_m y_k$. Afterward, the capacitance value obtained in phase 1 is subtracted from the capacitance value obtained in phase 2 to extract a differential capacitance value $\Delta Cx$ which is $\Delta Crx=Cx_m y_k+dCx_m y_k$. If the detected point 16 is a ghost point, as shown in FIG. 10, the aforesaid detection is performed to the detected point 16 to extract the differential capacitance value $\Delta Cx$ which is $\Delta Cgx=Cx_m y_k$. The value $dCx_m y_k$ is less than zero, and the real point can be identified by comparing the differential capacitance values $\Delta Crx$ and $\Delta Cgx$. In the embodiments proposed herein, the aforesaid computations are carried out by a firmware. In other embodiments, errors resulted from fingers and traces may be added into the computations.

Figure 11:
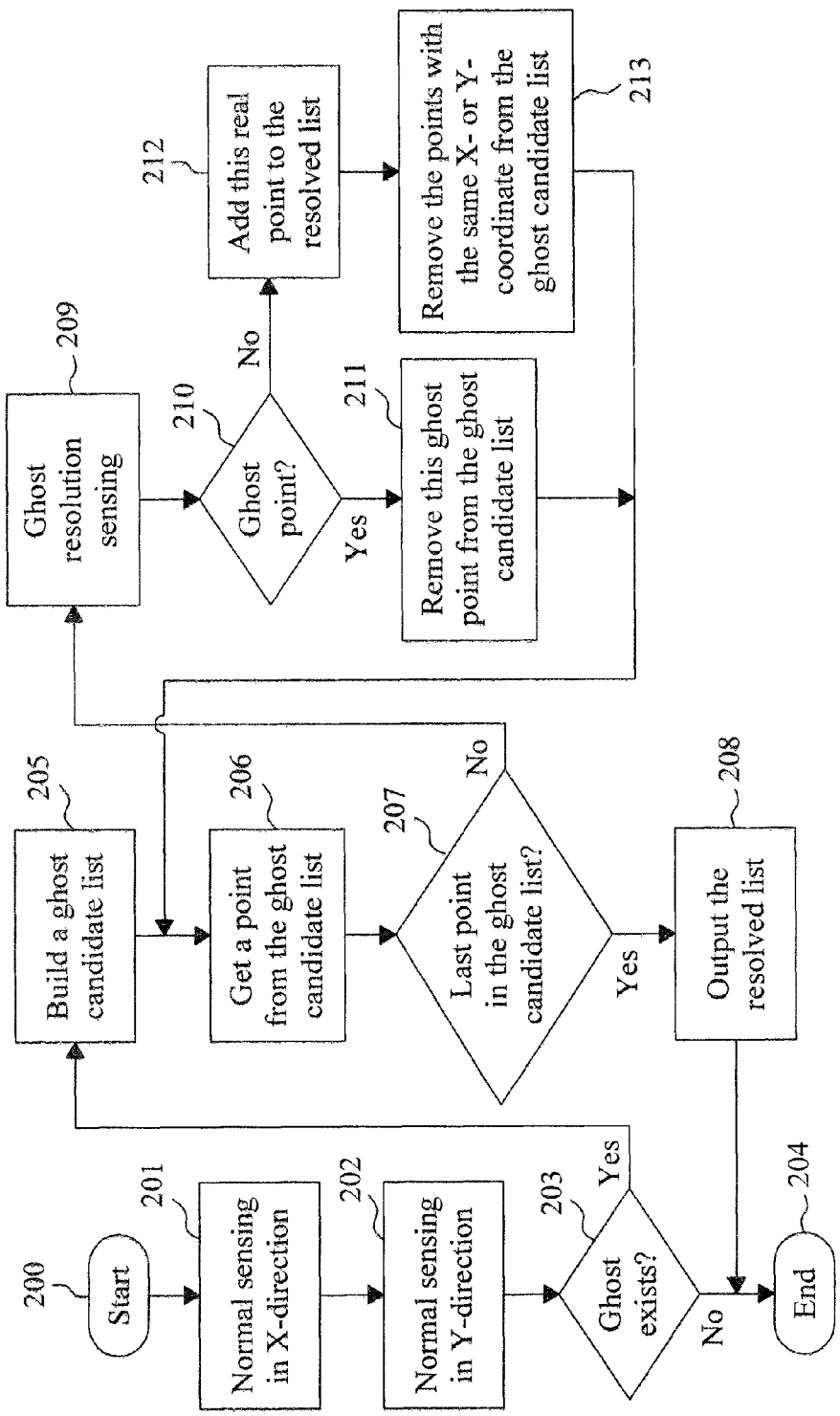
FIG. 11 is a flowchart of a sensing method for a capacitive touch panel including normal sensing and ghost resolution sensing.

FIG. 11 is a flowchart of a sensing method for a capacitive touch panel, which includes two stages, one for normal sensing as conventionally and the other for ghost resolution sensing according to the present invention. After starting the process at step 200, in the first stage, step 201 senses the traces in X-direction and step 202 senses the traces in Y-direction. Then, step 203 determines whether ghost exists. If no ghost exists, the detection results of the previous steps 201 and 202 are outputted, and the process ends at step 204. If ghost exists, the second stage, i.e. ghost resolution sensing, will be executed. First, step 205 builds a ghost candidate list to include all candidate ghost points. Next, step 206 selects a candidate ghost point from the ghost candidate list, and step 207 checks whether or not the selected candidate ghost point is the last one on the ghost candidate list. If yes, step 208 outputs a resolved list; if not, go to step 209 for ghost resolution sensing which includes the steps described in the above embodiments, namely either sensing the capacitance values of the traces in X-direction and in Y-direction at the selected candidate ghost point and summing up the two detected capacitance values, or sensing the capacitance value between the traces in X-direction and Y-direction at the selected candidate ghost point, so that comparison is made with the capacitance values extracted from another candidate ghost point, thereby determining whether or not the selected candidate ghost point is a ghost point in the next step 210. If the selected candidate ghost point is a ghost point, it is removed from the ghost candidate list at step 211, and the process goes back to step 206 to continue detecting other candidate ghost points. If the selected candidate ghost point is not a ghost point, it is identified as a real point and added to the resolved list at step 212, and step 213 removes this real point together with those candidate ghost points having the same coordinate in X-direction or in Y-direction from the ghost candidate list. Then, the process returns to step 206 and continues to detect the remaining candidate ghost points on the ghost candidate list. Finally, the resolved list is outputted at step 208, and the process ends at step 204. In this embodiment, the location of each candidate ghost point is represented by XY-coordinates, and thus the resolved list outputted at the end will contains the XY-coordinates of the real points, which enables precise positioning of the real points.

Figure 13:
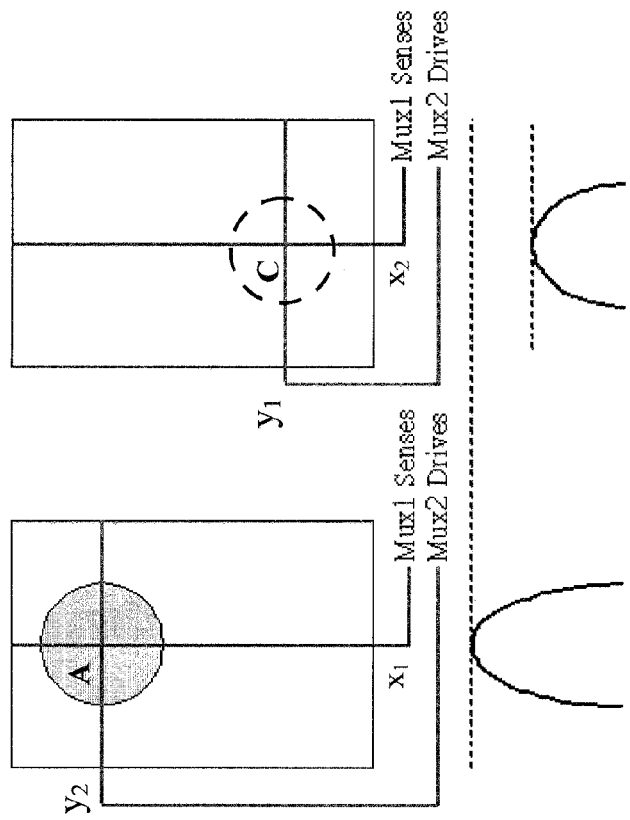
FIG. 13 is a diagram showing the difference between the ADC values extracted by in-phase crisscross drive.
Figure 12:
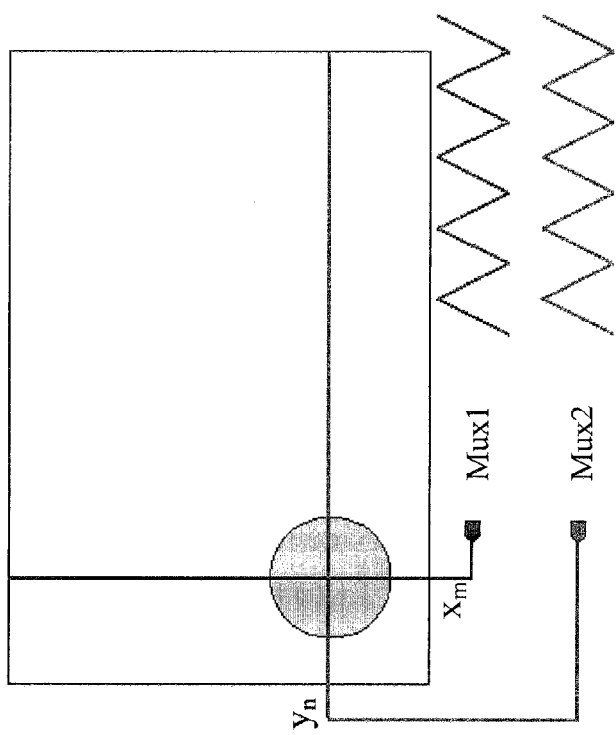
FIG. 12 is a diagram showing an in-phase crisscross drive according to the present invention.

It is further provided a crisscross drive method to reduce the base capacitance value at the intersection point (detected point) and thereby result in more significant variation in detection of capacitance value at the detected point, which is advantageous to circuit control. As shown in FIG. 12, when it is desired to sense the capacitance value at a point $(x_m, y_n)$ to recognize a real point by the an in-phase crisscross drive, a control circuit drives the trace $x_m$ with a signal Mux1 and the trace $y_n$ with a signal Mux2 which is in phase with the signal Mux1, for the trace $x_m$ to be sensed a capacitance value therefrom. FIG. 13 is a diagram showing the difference between the analog-to-digital conversion (ADC) values extracted by the in-phase crisscross drive, with the trace $x_1$ sensed by the signal Mux1 and the traces $y_1$ and $y_2$ respectively driven by the in-phase signal Mux2. The detected point A is a real point and thus, when the traces $x_1$ and $y_2$ are driven by the in-phase signals Mux1 and Mux2 respectively, the ADC value extracted by sensing the trace $x_1$ will be high and result in a logic high (1). The detected point C is a ghost point and thus, when the traces $x_1$ and $y_1$ are driven by the in-phase signals Mux1 and Mux2 respectively, the ADC value extracted by sensing the trace $x_1$ will be low and result n a logic low (0).

Figure 14:
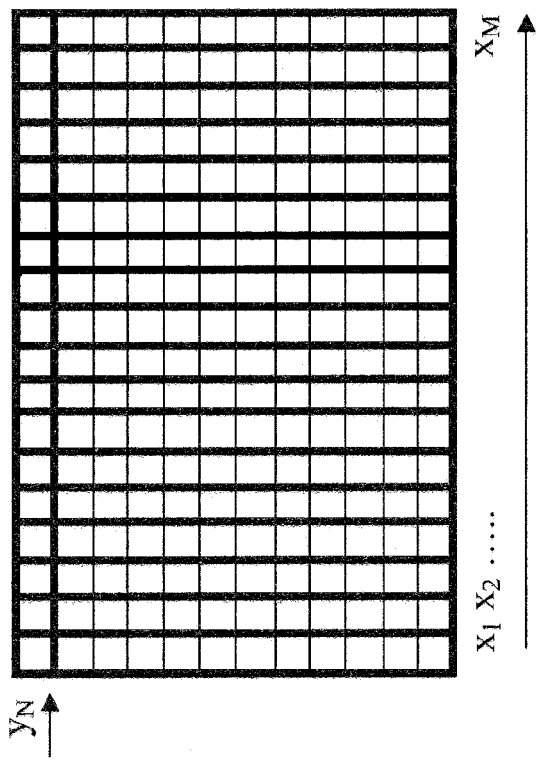
FIG. 14 is a diagram showing intersectional calibration according to the present invention.

The difference between the detected capacitance values at a real point and at a ghost point by the in-phase crisscross drive may be small, and therefore a calibration process is further provided. It is added a single-axis intersectional calibration step into the original calibration process to further enhance the accuracy of detection. As shown in FIG. 14, the signal Mux2 is used to drive one of a plurality of traces in Y-direction, for example $y_N$, and the signal Mux1 is used to scan all the traces in X-direction by driving them one by one sequentially, to extract the ADC value of each trace in X-direction as a parameter for subsequent calibration for a modulator to calibrate the modulation values and digital-to-analog conversion (DAC) values of the traces, so as to bring the ADC values of all traces to a same level.

Figure 15:
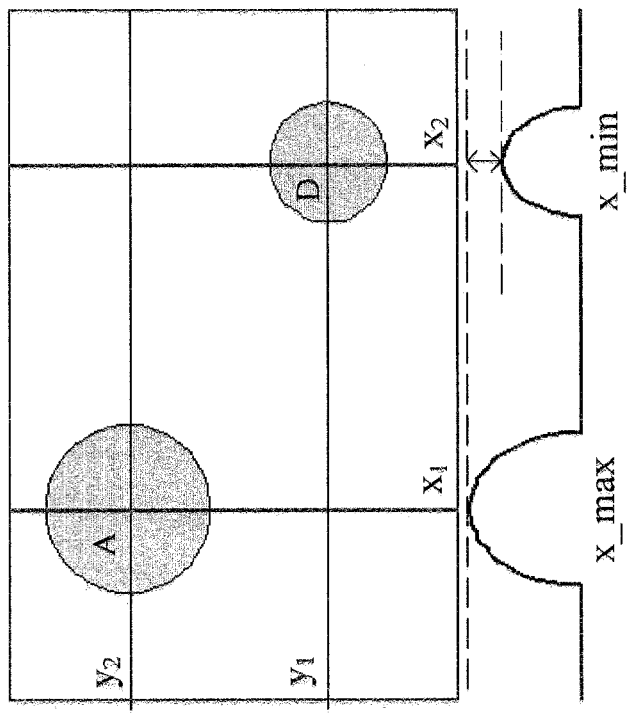
FIG. 15 is a diagram showing a ghost phenomenon induced by two fingers of different thicknesses.

According to the present invention, the real point of one finger is recognized and then the real point of another finger is derived accordingly. As shown in FIG. 15, in order to prevent an excessively large difference in the thickness of fingers from raising the error rate of detection, the finger inducing the greater detected value (x_max) in X-direction is selected as the first point to be recognized.

Figure 16:
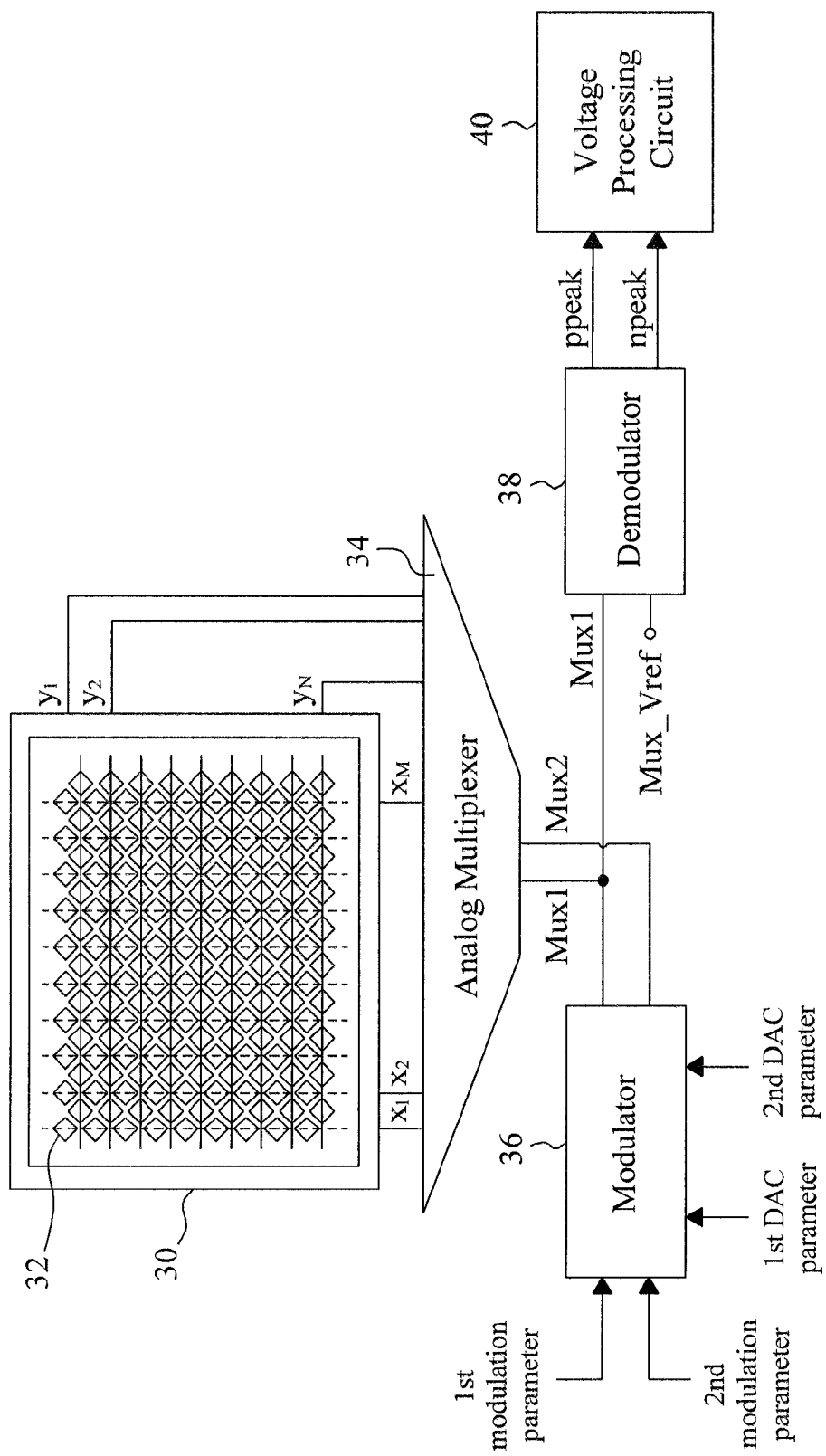
FIG. 16 is a diagram showing an embodiment of a capacitive touch panel for an application of a ghost resolution sensing method according to the present invention.

FIG. 16 is a diagram showing an embodiment of a capacitive touch panel for an application of a ghost resolution sensing method according to the present invention. A capacitive touch panel 30 has a plurality of sensors 32 arranged in a matrix, of which the sensors 32 in the longitudinal direction are connected by conductive wires to form traces $x_1, x_2, \ldots, x_M$, respectively, and by the same token, the sensors 32 in the transverse direction to form traces $y_1, y_2, \ldots, y_N$, respectively. A modulator 36 provides a current signal to apply to traces which are selected by an analog multiplexer 34, to be modulated into signals Mux1 and Mux2. Since the aforesaid intersectional calibration step is added into the original calibration process, in addition to a first modulation parameter and a first DAC parameter are generated as conventionally, a second modulation parameter and a second DAC parameter for intersectional calibration are also provided for the modulator 36 to assist in calibrating the ADC value of each trace. Moreover, since the in-phase crisscross drive is employed, a demodulator 38 in this embodiment uses an additionally provided reference signal Mux_Vref in demodulating the signal Mux1 to generate signals ppeak and npeak, for a voltage processing circuit 40 to convert the voltage difference between the signals ppeak and npeak to extract the information related to capacitance variation of the capacitive touch panel 30. The modulator 36 adjusts the base capacitance value of each trace with the modulation parameters and the DAC parameters by means of a conventional method, as is readily understood by a person skilled in the art.

In another embodiment, synchronous but out-of-phase signals may be selected as the signals Mux1 and Mux2 for crisscross drive and intersectional calibration to distinguish a real point from a ghost point.

Figure 17:
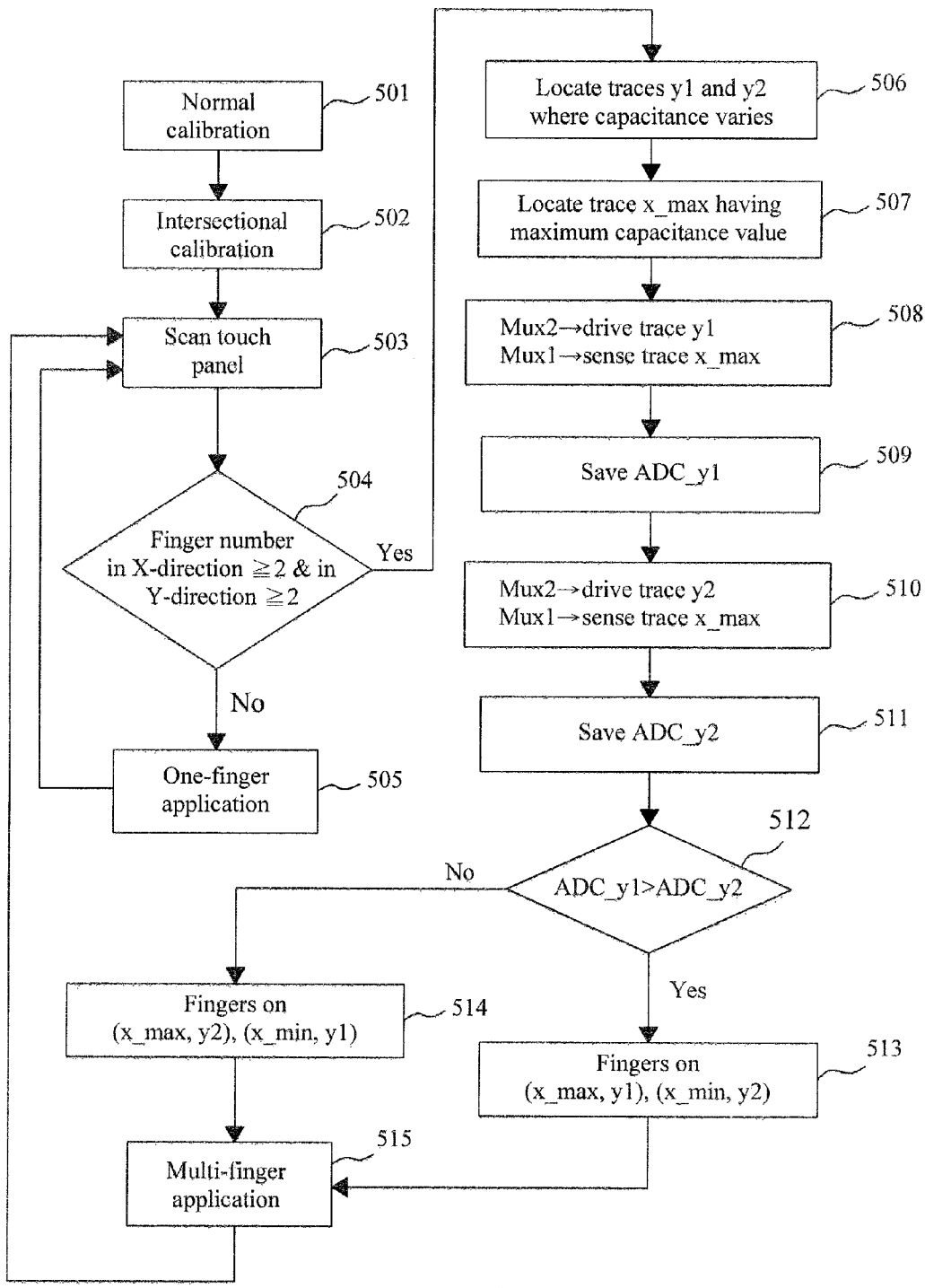
FIG. 17 is a flowchart of an embodiment for the case shown in FIG. 15.

FIG. 17 is a flowchart of an embodiment for the case shown in FIG. 15. Referring to FIG. 15, the finger at the point A is thicker than that at the point D, and in consequence the capacitance value at the point A is greater than that at the point D. Reference is now made to FIG. 17 in conjunction with FIG. 15. In addition to step 501 as conventionally, in which the first modulation parameter and the first DAC parameter for each trace of the capacitive touch panel are obtained by using a conventional general calibration, step 502 is added, in which the second modulation parameter and the second DAC parameter are obtained by using the intersectional calibration and provided for the modulator so that each trace of the capacitive touch panel has a same ADC value. After the calibrations, step 503 scans the capacitive touch panel, and step 504 determines if it is a multi-finger application. If not, step 505 reports it is a single-finger application, and the process returns to step 503; if yes, a crisscross drive begins. In the crisscross drive procedure, step 506 locates the traces $y_1$ and $y_2$ in Y-direction (shown in FIG. 15) where capacitance varies, and then, step 507 locates the trace x_max ($x_1$) having the maximum capacitance value in X-direction. Following that, step 508 drives the trace $y_1$ with the signal Mux2 and senses the trace x_max with the signal Mux1, and step 509 extracts and saves the ADC value ADC_$y_1$ of the trace $y_1$. Then, step 510 drives the trace $y_2$ with the signal Mux2 and senses the trace x_max with the signal Mux1, and step 511 extracts and saves the ADC value ADC_$y_2$ of the trace $y_2$. Step 512 compares ADC_$y_1$ with ADC_$y_2$. If ADC_$y_1$ is greater than ADC_$y_2$, then step 513 determines that the fingers are at points (x_max, $y_1$) and (x_min, $y_2$); otherwise, step 514 determines that the fingers are at points (x_max, $y_2$) and (x_min, $y_1$). After the real points of the fingers are found, step 515 reports it is a multi-finger application, and the process goes back to step 503 to continue scanning the capacitive touch panel.

While the present invention has been described in conjunction with preferred embodiment thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A ghost resolution sensing method for a capacitive touch panel suffering a ghost phenomenon involving two points on the capacitive touch panel corresponding to a same coordinate in a first direction, the ghost resolution method comprising:
    (A) scanning traces in two directions to determine if ghost points exist;
    (B) concurrently charging a trace in the first direction and a trace in a second direction at the first point;
    (C) sensing a first capacitance value from the charged trace in the first direction and a second capacitance value from the charged trace in the second direction at the first point;
    (D) summing up the first and second capacitance values to obtain a first summed-up capacitance value;
    (E) concurrently charging a trace in the first direction and a trace in the second direction at the second point;
    (F) sensing a third capacitance value from the charged trace in the first direction and a fourth capacitance value from the charged trace in the second direction at the second point;
    (G) summing up the third and fourth capacitance values to obtain a second summed-up capacitance value; and
    (H) recognizing a real point from the two points according to the first and second summed-up capacitance values;
    wherein the step (H) comprises:
    comparing the first summed-up capacitance value with the second summed-up capacitance value;
    selecting the first point as the real point if the first summed-up capacitance value is greater than the second summed-up capacitance value; and selecting the second point as the real point if the first summed-up capacitance value is less than the second summed-up capacitance value.

2. The ghost resolution sensing method of claim 1, further comprising adding the two points into a ghost candidate list.

3. The ghost resolution sensing method of claim 2, further comprising removing each identified point from the ghost candidate list after the step (H).

4. The ghost resolution sensing method of claim 3, further comprising removing each point having the same coordinate in the first direction or the same coordinate in the second direction as the real point from the ghost candidate list after the step (H).

5. A ghost resolution sensing method for a capacitive touch panel suffering a ghost phenomenon involving two points on the capacitive touch panel corresponding to a same coordinate in a first direction, the ghost resolution method comprising:
  (A) scanning traces in two directions to determine if ghost points exist;
  (B) concurrently charging a trace in the first direction and a trace in a second direction at the first point;
  (C) sensing a first capacitance value from the charged trace in the first direction and a second capacitance value from the charged trace in the second direction at the first point;
  (D) summing up the first and second capacitance values to obtain a first summed-up capacitance value;
  (E) concurrently charging a trace in the first direction and a trace in the second direction at the second point;
  (F) sensing a third capacitance value from the charged trace in the first direction and a fourth capacitance value from the charged trace in the second direction at the second point;
  (G) summing up the third and fourth capacitance values to obtain a second summed-up capacitance value; and
  (H) recognizing a real point from the two points according to the first and second summed-up capacitance values;
  wherein the step (H) comprises:
    comparing the first summed-up capacitance value with the second summed-up capacitance value;
    selecting the first point as the real point if the first summed-up capacitance value is greater than the second summed-up capacitance value;
    selecting the second point as the real point if the first summed-up capacitance value is less than the second summed-up capacitance value; and
    determining the two points both as ghost points if the first summed-up capacitance value is equal to the second summed-up capacitance value.

6. A ghost resolution sensing method for a capacitive touch panel suffering a ghost phenomenon involving two points on the capacitive touch panel corresponding to a same coordinate in a first direction, the ghost resolution method comprising:
  (A) scanning traces in two directions to determine if ghost points exist;
  (B) concurrently charging a trace in the first direction and a trace in a second direction at the first point for the trace in the first direction at the first point to be sensed a first capacitance value therefrom;
  (C) charging the trace in the first direction at the first point while grounding the trace in the second direction at the first point for the trace in the first direction at the first point to be sensed a second capacitance value therefrom;
  (D) extracting a first differential capacitance value between the first and second capacitance values;
  (E) concurrently charging a trace in the first direction and a trace in a second direction at the second point for the trace in the first direction at the second point to be sensed a third capacitance value therefrom;
  (F) charging the trace in the first direction at the second point while grounding the trace in the second direction at the second point for the trace in the first direction at the second point to be sensed a fourth capacitance value therefrom;
  (G) extracting a second differential capacitance value between the third and fourth capacitance values; and
  (H) recognizing a real point from the two points according to the first and second differential capacitance values.

7. The ghost resolution sensing method of claim 6, wherein the step (H) comprises:
  comparing the first differential capacitance value with the second differential capacitance value;
  selecting the first point as the real point and the second point as a ghost point if the first differential capacitance value is less than the second differential capacitance value; and
  selecting the second point as the real point and the first point as a ghost point if the first differential capacitance value is greater than the second differential capacitance value.

8. The ghost resolution sensing method of claim 7, further comprising adding the two points into a ghost candidate list.

9. The ghost resolution sensing method of claim 8, further comprising removing each identified point from the ghost candidate list after the step (H).

10. The ghost resolution sensing method of claim 9, further comprising removing each point having the same coordinate in the first direction or the same coordinate in the second direction as the real point from the ghost candidate list after the step (H).

11. The ghost resolution sensing method of claim 6, wherein the step (H) comprises:
  comparing the first differential capacitance value with the second differential capacitance value;
  selecting the first point as the real point and the second point as a ghost point if the first differential capacitance value is less than the second differential capacitance value;
  selecting the second point as the real point and the first point as a ghost point if the first differential capacitance value is greater than the second differential capacitance value; and
  determining the two points both as ghost points if the first differential capacitance value is equal to the second differential capacitance value.

12. A ghost resolution sensing method for a capacitive touch panel suffering a ghost phenomenon involving two points on the capacitive touch panel corresponding to a same coordinate in a first direction, the ghost resolution method comprising:
  (A) scanning traces in two directions to determine if ghost points exist;
  (B) concurrently driving a trace in the first direction at the first point with a first signal and a trace in a second direction at the first point with a second signal synchronous to the first signal;
  (C) sensing a first capacitance value from the driven trace in the first direction or the driven trace in the second direction at the first point;

(D) concurrently driving a trace in the first direction at the second point with the first signal, and a trace in the second direction at the second point with the second signal;

(E) sensing a second capacitance value from the driven trace in the first direction or the driven trace in the second direction at the second point; and (F) recognizing a real point from the two points according to the first and second capacitance values;

wherein the step (F) comprises:

comparing the first capacitance value with the second capacitance value;

selecting the first point as the real point if the first capacitance value is greater than the second capacitance value; and selecting the second point as the real point if the first capacitance value is less than the second capacitance value.

13. The ghost resolution sensing method of claim 12, wherein the second signal is in phase with the first signal.

14. The ghost resolution sensing method of claim 12, wherein the second signal is out of phase with the first signal.

15. The ghost resolution sensing method of claim 12, further comprising:

driving any trace in the second direction of the capacitive touch panel with the second signal;

scanning all traces in the first direction of the capacitive touch panel by driving them one by one with the first signal; and from each trace in the first direction, sensing a capacitance value to calibrate a base capacitance value therefor.

\* \* \* \* \*